United States Patent
Mohite et al.

(10) Patent No.: US 12,033,368 B2
(45) Date of Patent: Jul. 9, 2024

(54) METHOD AND SYSTEM FOR PROVIDING GENERALIZED APPROACH FOR CROP MAPPING ACROSS REGIONS WITH VARYING CHARACTERISTICS

(71) Applicant: Tata Consultancy Services Limited, Mumbai (IN)

(72) Inventors: Jayantrao Mohite, Thane (IN); Suryakant Ashok Sawant, Thane (IN); Ankur Pandit, Thane (IN); Srinivasu Pappula, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 381 days.

(21) Appl. No.: 17/585,108

(22) Filed: Jan. 26, 2022

(65) Prior Publication Data

US 2022/0237888 A1    Jul. 28, 2022

(30) Foreign Application Priority Data

Jan. 27, 2021  (IN) .............................. 202121003692

(51) Int. Cl.
*G06V 10/48*    (2022.01)
*G06F 18/214*    (2023.01)
(Continued)

(52) U.S. Cl.
CPC ............. *G06V 10/48* (2022.01); *G06N 20/00* (2019.01); *G06V 10/761* (2022.01); *G06V 10/774* (2022.01)

(58) Field of Classification Search
CPC .... G06V 10/48; G06V 10/761; G06V 10/774; G06V 20/13; G06V 20/188; G06N 20/00; G06F 18/2155
See application file for complete search history.

(56) References Cited

U.S. PATENT DOCUMENTS

| | | |
|---|---|---|
| 10,586,105 B2 | 3/2020 | Freitag et al. |
| 2020/0065968 A1* | 2/2020 | Sargent ................. G06V 10/82 |
| 2020/0126232 A1* | 4/2020 | Guo ....................... G06V 10/82 |

OTHER PUBLICATIONS

Zhang, Lin et al., "Crop Mapping Based on Historical Samples and New Training Samples Generation in Heilongjiang Province, China", *Sustainability*, Date: 2019, vol. 11(18), Publisher: MDPI, https://www.mdpi.com/2071-1050/11/18/5052.

(Continued)

*Primary Examiner* — John W Lee
(74) *Attorney, Agent, or Firm* — Finnegan, Henderson, Farabow, Garrett & Dunner, LLP (57) ABSTRACT

Machine Learning models to be created for crop mapping for any region, require huge volumes of ground truth data requiring manual effort in generating region specific training dataset. Method and system for providing generalized approach for crop mapping across regions with varying characteristics is disclosed. The method provides automatic generation of a labelled pixel dataset representing cropping pattern of a Region of Interest (ROI) for building a ML crop mapping model for the ROI. The generated labelled pixel dataset captures regional dependency and localized phenological indicators for the ROI. ML crop mapping model is updated using a database, regularly updated for the set of crops and the plurality of features associated with each of the set of crops and corresponding the set of crops.

9 Claims, 3 Drawing Sheets

(51) Int. Cl.
*G06N 20/00* (2019.01)
*G06V 10/74* (2022.01)
*G06V 10/774* (2022.01)
*G06V 20/10* (2022.01)
*G06V 20/13* (2022.01)

(56) References Cited

OTHER PUBLICATIONS

Mazzia Vittorio et al., "Improvement in Land Cover and Crop Classification based on Temporal Features Learning from Sentinel-2 Data Using Recurrent-Convolutional Neural Network (R-CNN)", Applied Sciences, Date: 2020, vol. 10(1), Publisher: MDPI, https://www.mdpi.com/2076-3417/10/1/238.

Ghazaryan, Gohar et al., "A rule-based approach for crop identification using multi-temporal and multi-sensor phenological metrics", European Journal of Remote Sensing, Date: Jan. 2018, vol. 51, Issue: 1, pp. 511-524, Publisher: T and f online, https:/www.tandfonline.com/doi/pdf/10.1080/22797254.2018.1455540?needAccess=true.

Jia, Xiaowei et al., "Bringing automated, remote-sensed, machine learning methods to monitoring crop landscapes at scale", Remote Sensing of Environment, Date: 2019, Publisher: Research Gate, https://ur.booksc.org/book/77703706/5e7753.

\* cited by examiner

METHOD AND SYSTEM FOR PROVIDING GENERALIZED APPROACH FOR CROP MAPPING ACROSS REGIONS WITH VARYING CHARACTERISTICS

PRIORITY CLAIM

This U.S. patent application claims priority under 35 U.S.C. § 119 to: India Application No. 202121003692, filed on Jan. 27, 2021. The entire contents of the aforementioned application are incorporated herein by reference.

TECHNICAL FIELD

The embodiments herein generally relate to Machine Learning and, more particularly, to a method and system for providing generalized approach for crop mapping across regions with varying characteristics.

BACKGROUND

Crop mapping refers to mapping of crop area according to type, stage of crop development and so on. The crop mapping information is used by various stakeholders such as government, Agri-input suppliers, insurance companies etc., to estimate crop inventories of what, where, and when certain crops are grown. Further insights are derived on supply and yield prediction, soil productivity, land use intensity, damage estimation from natural disasters, monitoring general agricultural trends and the like. Machine learning approaches have enabled automation in the crop mapping task to a large extent. Accurate and on-time information of extent of crops is critical for quick decision making.

Most of the current algorithms require collecting huge amount of ground data using manual workforce, and then developing a typical machine/deep learning based classification models for crop area mapping. This approach has dependency on ground truth data. The temporal adaptation is difficult due to year to year change in crop sowing window. Further, a model created for one region cannot be applied to other regions, mainly due to change in cropping pattern in other regions. Also, such models do not consider localization factor which could be useful for region specific spatial adaptation of the models. In countries or regions where cropping pattern may vary significantly over regions due to local factors and have small or patchy cultivation, faster generation of region specific customized ML models is required. Conventional ground truth data collection based ML approaches are time consuming and require manual effort to a large extent. Further, once created model cannot be relied for too long as conditions in and around the region keep varying due to changing trends in cropping pattern, gradual climatic variations. Thus, recreating the models for the region is additional time consuming task.

SUMMARY

Embodiments of the present disclosure present technological improvements as solutions to one or more of the above-mentioned technical problems recognized by the inventors in conventional systems. For example, in one embodiment, a method for providing generalized approach for crop mapping across regions with varying characteristics. is disclosed.

The method comprises generating a labelled pixel dataset representing cropping pattern of a Region of Interest (ROI) for building a ML crop mapping model for the ROI, wherein the generated labelled pixel dataset captures regional dependency and localized phenological indicators for the ROI. Generating the labelled pixel dataset comprises, receiving a plurality of remote sensing images of the ROI covering a plurality of climatic seasons spread across a predefined timespan. Further, randomly selecting a set of pixels from the plurality of remote sensing images and obtaining a plurality of pixel features for each of the plurality of pixels, wherein the plurality of pixel features comprise remote sensing and time series-based features predefined for the ROI. Further, analyzing the plurality of pixel features obtained for each of the plurality of pixels with a plurality of crop features associated with each crop among a set of crops identified for the ROI, wherein the set of crops, and corresponding plurality of features for each of the set of crops are pre-identified for the ROI using Machine Learning (ML) based approach in accordance with agro-related historical information and localized phenological features obtained for the ROI from a plurality of sources. Furthermore, identifying and labelling a plurality of optimal pixels from the set of pixels with a crop among the set of crops to generate the labelled pixel dataset, wherein each of the plurality of optimal sample pixels are identified and labelled with an associated crop label based on degree of similarity computed between a) each of the plurality of optimal pixels and corresponding plurality of pixel features with b) the set of crops and the associated plurality of crop features.

Further, the method comprises building the ML crop mapping model for the ROI using training data comprising the labelled plurality of good samples, the corresponding plurality of pixel features and a set of remote sensing images for the ROI, wherein the ML crop mapping models learns the pattern from the training data and the set of remote sensing images to predict associated crop for each input pixel.

Furthermore, the method comprises generating a crop map for a received remote sensing image of the ROI, using the built ML crop mapping model implemented by the one or more hardware processor, by predicting a crop class, among a plurality of crop classes, with a confidence score for each of the plurality of pixels of the received remote sensing image.

Furthermore, the method comprises updating the ML crop mapping models using a database regularly updated for the set of crops and the plurality of features associated with each of the set of crops and corresponding the set of crops.

In another aspect, a system for providing generalized approach for crop mapping across regions with varying characteristics is disclosed. The device comprises a memory storing instructions; one or more Input/Output (I/O) interfaces; and one or more hardware processors coupled to the memory via the one or more I/O interfaces, wherein the one or more hardware processors are configured by the instructions to generate a labelled pixel dataset representing cropping pattern of a Region of Interest (ROI) for building a ML crop mapping model for the ROI, wherein the generated labelled pixel dataset captures regional dependency and localized phenological indicators for the ROI. Generating the labelled pixel dataset comprises, receiving a plurality of remote sensing images of the ROI covering a plurality of climatic seasons spread across a predefined timespan. Further, randomly selecting a set of pixels from the plurality of remote sensing images and obtaining a plurality of pixel features for each of the plurality of pixels, wherein the plurality of pixel features comprise remote sensing and time series-based features predefined for the ROI. Further, analyzing the plurality of pixel features obtained for each of the plurality of pixels with a plurality of crop features associated with each crop among a set of crops identified for the ROI, wherein the set of crops, corresponding plurality of features for each of the set of crops is pre-identified for the ROI using Machine Learning (ML) based approach in accordance with agro-related historical information and localized phenological features obtained for the ROI from a plurality of sources. Furthermore, identifying and labelling a plurality of optimal pixels from the set of pixels with a crop among the set of crops to generate the labelled pixel dataset, wherein each of the plurality of optimal pixels are identified and labelled with an associated crop label based on degree of similarity computed between a) each of the plurality of optimal pixels and corresponding plurality of pixel features with b) the set of crops and the associated plurality of crop features.

Further, the one or more hardware processors are configured to build the ML crop mapping model for the ROI using training data comprising the labelled plurality of good samples, the corresponding plurality of pixel features and a set of remote sensing images for the ROI, wherein the ML crop mapping model learns the pattern from the training data and the set of remote sensing images to predict associated crop for each input pixel.

Furthermore, the one or more hardware processors are configured to generate a crop map for a received remote sensing image of the ROI, using the built ML crop mapping model implemented by the one or more hardware processor, by predicting a crop class, among a plurality of crop classes, with a confidence score for each of the plurality of pixels of the received remote sensing image.

Furthermore, the one or more hardware processors are configured to update the ML crop mapping models using a database regularly updated for the set of crops and the plurality of features associated with each of the set of crops and corresponding the set of crops.

In yet another aspect, there are provided one or more non-transitory machine-readable information storage mediums comprising one or more instructions, which when executed by one or more hardware processors causes a method for providing generalized approach for crop mapping across regions with varying characteristics. The method comprises generating a labelled pixel dataset representing cropping pattern of a Region of Interest (ROI) for building a ML crop mapping model for the ROI, wherein the generated labelled pixel dataset captures regional dependency and localized phenological indicators for the ROI. Generating the labelled pixel dataset comprises, receiving a plurality of remote sensing images of the ROI covering a plurality of climatic seasons spread across a predefined timespan. Further, randomly selecting a set of pixels from the plurality of remote sensing images and obtaining a plurality of pixel features for each of the plurality of pixels, wherein the plurality of pixel features comprise remote sensing and time series-based features predefined for the ROI. Further, analyzing the plurality of pixel features obtained for each of the plurality of pixels with a plurality of crop features associated with each crop among a set of crops identified for the ROI, wherein the set of crops, corresponding plurality of features for each of the set of crops is pre-identified for the ROI using Machine Learning (ML) based approach in accordance with agro-related historical information and localized phenological features obtained for the ROI from a plurality of sources. Furthermore, identifying and labelling a plurality of optimal pixels from the set of pixels with a crop among the set of crops to generate the labelled pixel dataset, wherein each of the plurality of optimal pixels are identified and labelled with an associated crop label based on degree of similarity computed between a) each of the plurality of optimal pixels and corresponding plurality of pixel features with b) the set of crops and the associated plurality of crop features.

Further, the method comprises building the ML crop mapping model for the ROI using training data comprising the labelled plurality of good samples, the corresponding plurality of pixel features and a set of remote sensing images for the ROI, wherein the ML crop mapping model learns the pattern from the training data and the set of remote sensing images to predict associated crop for each input pixel.

Furthermore, the method comprises generating a crop map for a received remote sensing image of the ROI, using the built ML crop mapping model implemented by the one or more hardware processors, by predicting a crop class, among a plurality of crop classes, with a confidence score for each of the plurality of pixels of the received remote sensing image.

Furthermore, the method comprises updating the ML crop mapping models using a database, regularly updated for the set of crops and the plurality of features associated with each of the set of crops and corresponding the set of crops.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Accurate and on-time information of extent of crops is critical for quick decision making. Thus, for automated crop mapping, region specific Machine Learning (ML) models are expected to be built in minimal time and provide well trained models for accurate crop mapping.

Embodiments herein provide a method and system for providing generalized approach for crop mapping across regions with varying characteristics. The method provides automatic generation of a labelled pixel dataset representing cropping pattern of a Region of Interest (ROI) for building the ML crop mapping model for the ROI. The generated labelled pixel dataset captures regional dependency and localized phenological indicators for the ROI. Unlike the existing approaches which require manual effort for ground truth data collection and labelling or annotation of the data, the method provides an automated way to capture ground truth data and generate labelled training data specific to any ROI. Thereafter, the ML cropping models for the ROI are generated using the labelled training data.

Labelling the pixel dataset is performed based on a set of crops and corresponding plurality of features for each of the set of crops, which are pre-identified for the ROI using Machine Learning (ML) based approach. The set of crops and the plurality of features are extracted from agro-related historical information and localized phenological features obtained for the ROI from a plurality of sources. Thus, information on unique features of a crop is obtained from various sources and then that information along with satellite data or the remote sensing image data is converted to knowledge in terms of some thresholds/time-series using machine learning/time-series analysis etc This crop database is frequently updated and accordingly the ROI specific local features are updated for crop mapping, enabling continuously updating of the ML crop mapping model for the ROI.

Figure 1:
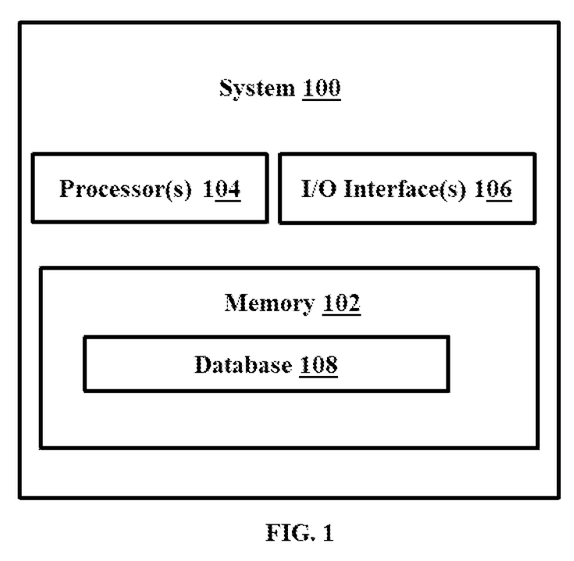
FIG. 1 is a functional block diagram of a system for providing generalized approach for crop mapping across regions with varying characteristics, in accordance with some embodiments of the present disclosure.
Figure 2A:
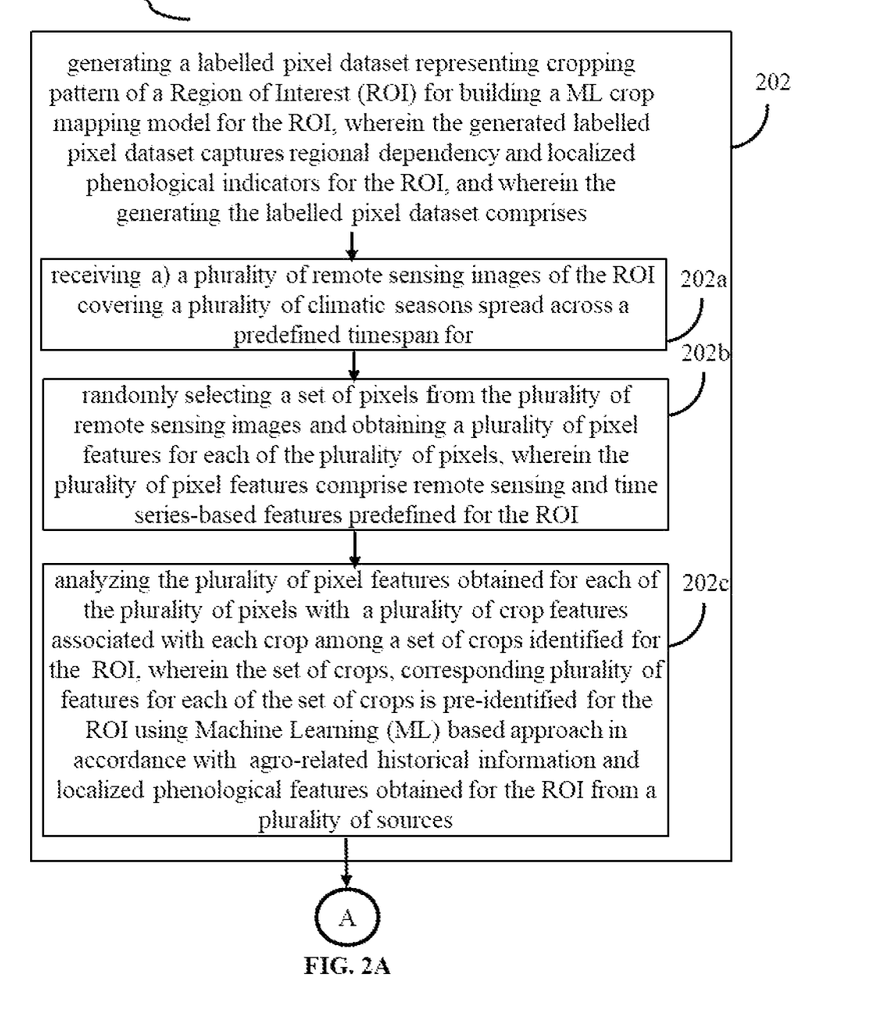
FIG. 2A and FIG. 2B are flow diagrams illustrating a method for providing generalized approach for crop mapping across regions with varying characteristics using the system of FIG. 1, in accordance with some embodiments of the present disclosure.
Figure 2B:
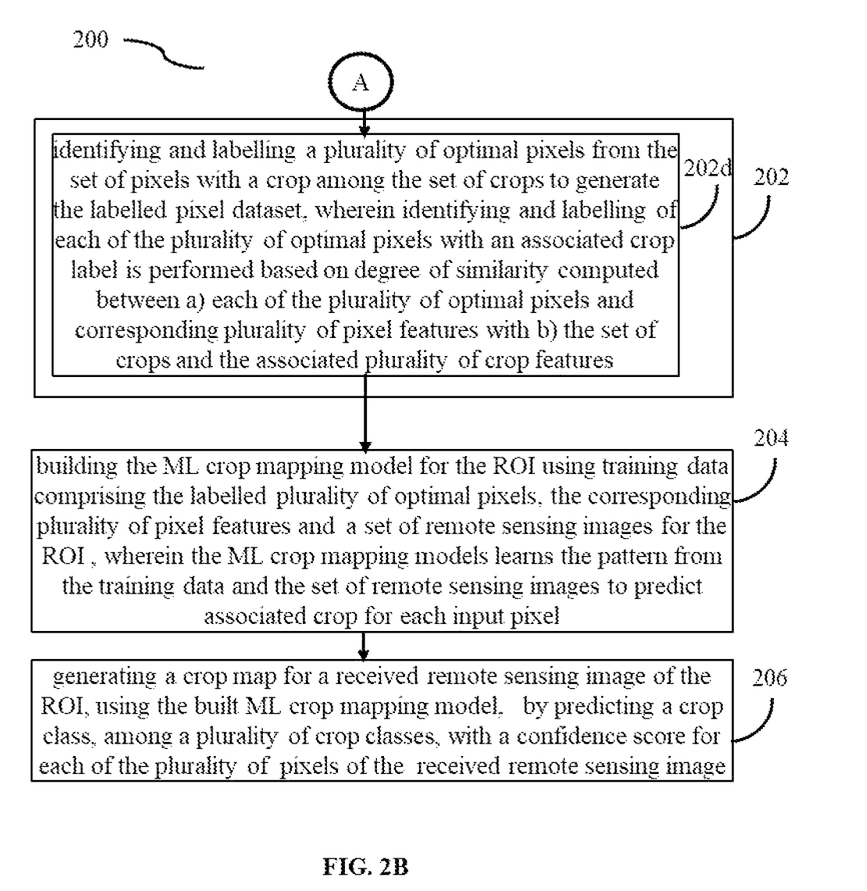

Referring now to the drawings, and more particularly to FIGS. 1 through 2B, where similar reference characters denote corresponding features consistently throughout the figures, there are shown preferred embodiments and these embodiments are described in the context of the following exemplary system and/or method.

FIG. 1 is a functional block diagram of a system 100 for providing generalized approach for crop mapping across regions with varying characteristics, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, personal digital assistants, cloud servers and the like.

The I/O interface(s) 106 can include a variety of software and hardware interfaces, for example, a web interface, a graphical user interface and can facilitate multiple communications within a wide variety of networks N/W and protocol types such as the m-UDP, including wired networks, for example, LAN, cable, etc., and wireless networks, such as WLAN, cellular, or satellite. In an embodiment, the I/O interface (s) 106 can include one or more ports for connecting a number of devices (nodes) of the field to one another or to another server or devices. The I/O interface 106 enables communicating with a plurality of external sources to collect the agro-related historical information and the localized phenological features obtained for the ROI. The plurality of sources includes sources providing remote sensing images/data for the ROI covering a plurality of climatic seasons spread across a predefined timespan, agro-related historical information and localized phenological features obtained for the ROI. The historical information is received for the timespan includes datapoints collected from local sources, subject experts, climatic conditions and crop related data and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 may include a plurality ML models including the ML crop mapping model and the like (not shown) for automated data labelling and crop mapping. and the like. The memory also includes a database 108, wherein all the data collected from plurality of sources, remote sensing images for the ROI and the like are stored. The memory 102 may comprise information pertaining to input(s)/output(s) of each step performed by the processor(s) 104 of the system 100 and methods of the present disclosure. In an embodiment, the database 108 may be external (not shown) to the system 100 and coupled via the I/O interface 106. Functions of the components of the system 100 are explained in conjunction with flow diagram of FIGS. 2A and 2B.

FIG. 2A and FIG. 2B are flow diagrams illustrating a method 200 for providing generalized approach for crop mapping across regions with varying characteristics using the system of FIG. 1, in accordance with some embodiments of the present disclosure. In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIG. 2A and FIG. 2B. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Initially, the ROI for which the crop mapping has to be performed is identified. Referring now to the steps of the method 200, at step 202, the one or more hardware processors 104 generate a labelled pixel dataset representing cropping pattern of the Region of Interest (ROI) for building the ML crop mapping model for the ROI. The labelled pixel dataset, which is generated captures regional dependency and localized phenological indicators for the ROI. The steps of the method 200 for generating the labelled pixel dataset are explained below.

a) Receiving (202a) a plurality of remote sensing images of the ROI covering a plurality of climatic seasons spread across a predefined timespan. The predefined time span can be a year, a decade and so on based on the requirement for further crop analysis. Here plurality of climatic seasons is considered for generating standard or unique set of features for multiple crops. But while generating the labelled pixels, only the crop season which is currently in-progress is considered. For any region, dataset on major crops as well as inter-crops in a season (Kharif/Rabi/Sumer/Overlapping) is created within the database 108 by sourcing data from the regional agriculture university databases, openly available data on internet, research papers, agriculture reports etc. In addition to this, crop specific unique spatio-temporal/phenology features database is also generated using historical satellite observations from the remote sensing image data. Information is collected from various authentic sources such as Agriculture University research papers/bulletins, Govt published reports, internet, information received from the farmers and is stored in databases, such as AgriKNOB™. This information is updated over a period of time, as and when any information is available b) Upon receiving the remote sensing images for the ROI, the next step includes randomly selecting (202b) a set of pixels from the plurality of remote sensing images and obtaining a plurality of pixel features for each of the plurality of pixels, wherein the plurality of pixel features comprise remote sensing and time series-based features predefined for the ROI. The logic for random selection can be predefined, such that it cover pixels across the image, specifically avoiding the border area pixels which may not be good candidates for crop mapping. Thus, the selection criteria restricts random selection of pixels from agriculture area only. To get the agriculture area for the ROI, existing available agriculture layers are used. Even once the agriculture layers in the image are identified, the pixels from boundary of agriculture layer are avoided as they may have overlapping features capturing characteristics of neighboring non-agriculture area. Analyzing (202c) the plurality of pixel features obtained for each of the plurality of pixels with a plurality of crop features associated with each crop among a set of crops identified for the ROI. The set of crops, corresponding plurality of features for each of the set of crops is pre-identified for the ROI using Machine Learning (ML) based approach in accordance with agro-related historical information and localized phenological features obtained for the ROI from the plurality of sources. The crops for the ROI across time span can be learnt using pretrained ML models using standard ML techniques. The plurality of pixel features are crop specific spatio-temporal unique/phenology features using time-series satellite data and geotagged images/videos of crops, while the plurality of crop features relate to the crop condition/seasons etc.

Example 1—Unique features obtained from time-series data for rice include one or more parameters obtained from the remote sensing images. The parameters can have different ranges/threshold based on the region it belongs to. This mapping between the pixel features and corresponding crop can be learnt using pretrained ML models using standard ML techniques or can be defined by and expert.

1. Pixel feature—VHmin (minimum backscatter value), Crop feature—early season/sowing period)
2. Pixel feature—Soil Moisture Crop feature—0 to x days (e.g., 0-15 days) of transplanting.

These features in the mentioned example are stored in databases such as the AgriKNOB™. Now for the current season, for a given ROI, number of crops are known. Assuming 5 crops are grown in the ROI, from the AgriKNOB™ data source, total 20 features spanning across those 5 crops are available, which are estimated from the remote sensing images/satellite data for the current season for the set of random pixels. The system then performs comparison between the stored information on features for a crop c1 and those features estimated from current satellite data. This way a similarity score is assigned for each of the c1, c2, c3, c4 and c5 crops. Any known suitable similarity score computations techniques can be used. Crop with maximum similarity will be assigned to that random pixel Same process is repeated for all random pixels in ROI.

Example 2—Unique feature obtained from time-series data for Sugarcane: The parameters can have different ranges/threshold based on the region it belongs 1. Phenology feature such as Length of the season: For Sugarcane it is larger (365-600 days) length of the season
2. Median Normalized Difference Vegetation Index Thus, such multiple unique features can be generated for various crops/regions. It can be understood by person having ordinary skill in the art that the two features mentioned are for example and not a limitation.

c) Once the mapping between pixel features and a crop is available, then the step includes identifying and labelling of a plurality of optimal pixels with a crop among the set of crops is performed to generate the labelled pixel dataset. The identification and labelling of each of the plurality of optimal pixels with an associated crop label is performed based on degree of similarity computed between a) each of the plurality of optimal pixels and corresponding plurality of pixel features with b) the set of crops and the associated plurality of crop features. Data from plurality of climatic seasons is considered for crop specific feature generation.

| Pseudocode 1 - Identifying or selecting the plurality of optimal pixels and labelling (pixel to crop mapping): | |
|---|---|
| Start | |
| 1. | Draw some random pixels from current image (p1, p2 . . . pn) for each pixel pi |
| 2. | Estimate the features from current year data (f1, f2, . . . fn) |
| 3. | Assume historical unique features for Crop C1 as F1, F2, . . . Fn |
| 4. | Estimate the degree of similarity between the pairs (f1, F1), (f2, F2) . . . (f3 . . . Fn) and generate similarity score, also referred as degree of similarity (DS). |
| 5. | If DS > Predefined threshold consider it as that crop C1 pixel if DS < Predefined threshold |
| 6. | Repeat the steps 2-5 to check the randomly drawn pixel belongs to other crop classes of the region (C2, C3 . . . Cn) |
| 7. | If the DS < Predefined threshold for all crops (C1, C2, . . . Cn) Discard the pixel (optimal pixel identification/selection criteria0 |
| 8. | Repeat the steps 1-7 till we get desired no of optimal pixels |
| End | |

Once the labelled pixel dataset is obtained, at step 204 of the method 200, the one or more hardware processors 104 build the ML crop mapping model for the ROI using training data comprising the labelled plurality of optimal pixels (good sample pixels), the corresponding plurality of pixel features and a set of remote sensing images for the ROI. The ML crop mapping model learns the pattern from the training data and the set of remote sensing images to predict associated crop for each input pixel. Based on the region, major crops, no of pixels and satellite images available, system 100 can choose the number of features needed (combination of regional, localized and phenological features), kind of model (Machine learning/Deep Learning), number of remote sensing images etc. The ML models are trained till maximum accuracy is obtained. Use of the localized features enable spatial adaptation of the models. However, considering that the temporal phenology parameters will help for temporal (year-year) adaptation of the models. The process is repeated during the season as and when the new image is available to refine the crop map. Thus, the ML crop mapping model is updated using the regularly updated database 108 that includes updating the images for every new season, updating change in the set of crops and the plurality of features associated with each of the set of crops.

Pseudocode 2- Training the ML crop mapping model

Start
1. Train the model using randomly drawn reliable samples and current year as on date available satellite data for the season
2. Check the validation accuracy
3. Repeat the process with addition of images with passing time till we reach desired accuracy
4. Generate crop probability maps
End Further, validation of ML crop mapping model is performed using the current year ground data and generation of crop probability maps.

Pseudocode 3- Updating of crop database using the crop probability maps

Start
1. Get crop wise pixels with probability more than 'y' wherein say value of y=0.95
2. Generate the features for the current season for those pixels
3. Compare it with predefined database of features
4. Update database if required
End Thus, the method disclosed provides automatic generation of crop specific samples (labelled dataset) based on region specific subset of crops, crop specific unique features, climatic conditions etc. and then building region specific ML cropping models. Unlike the existing methods, this enables spatial-temporal adaptations of the ML models, without need of actual ground truth data.

At step 206 of the method 200, the one or more hardware processors 104 generate a crop map for a received remote sensing image of the ROI, using the built ML crop mapping model, by predicting a crop class, among a plurality of crop classes, with a confidence score for each of the plurality of pixels of the received remote sensing image.

The assignment of class (crop class) is based on maximum probability approach in ML. Here each pixel may get multiple probabilities such as, a pixel having a rice crop with probability of 0.95, pixel having a wheat crop 0.04, pixel having a barley crop 0.01. It is to be understood by a person having ordinary skill in the art or person skilled in the art that the various crops can take any probability values and example of such probability values shall not be construed as limiting the scope of the present disclosure. Since, the highest probability has been predicted for rice crop, so the corresponding pixel will be assigned rice crop.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for providing generalized approach for crop mapping across regions with varying characteristics, the method comprising:
    generating, by one or more hardware processors, a labelled pixel dataset representing cropping pattern of a Region of Interest (ROI) for building a ML crop mapping model for the ROI, wherein the generated labelled pixel dataset captures regional dependency and localized phenological indicators for the ROI, and wherein the generating the labelled pixel dataset comprises:
        receiving a plurality of remote sensing images of the ROI covering a plurality of climatic seasons spread across a predefined timespan;
        randomly selecting a set of pixels from the plurality of remote sensing images and obtaining a plurality of pixel features for each of the plurality of pixels, wherein the plurality of pixel features comprise remote sensing and time series-based features predefined for the ROI;
        analysing the plurality of pixel features obtained for each of the plurality of pixels with a plurality of crop features associated with each crop among a set of crops identified for the ROI, wherein the set of crops, and corresponding plurality of features for each of the set of crops are pre-identified for the ROI using Machine Learning (ML) based approach in accordance with agro-related historical information and localized phenological features obtained for the ROI from a plurality of sources; and
        identifying and labelling a plurality of optimal pixels from the set of pixels with a crop among the set of crops to generate the labelled pixel dataset, wherein each of the plurality of optimal pixels are identified and labelled with an associated crop label based on degree of similarity computed between a) each of the plurality of optimal pixels and corresponding plurality of pixel features with b) the set of crops and the associated plurality of crop features; and
    building, by the one or more hardware processors, the ML crop mapping model for the ROI using training data comprising the labelled plurality of optimal pixels, the corresponding plurality of pixel features and a set of remote sensing images for the ROI, wherein the ML crop mapping model learns the pattern from the training data and the set of remote sensing images to predict associated crop for each input pixel.

2. The method of claim 1, further comprising generating a crop map for a received remote sensing image of the ROI, using the built ML crop mapping model implemented by the one or more hardware processors, by predicting a crop class, among a plurality of crop classes, with a confidence score for each of the plurality of pixels of the received remote sensing image.

3. The method of claim 1, further comprising updating the ML crop mapping models using a database regularly updated for the set of crops and the plurality of features associated with each of the set of crops and corresponding the set of crops.

4. A system for providing generalized approach for crop mapping across regions with varying characteristics, the system comprising:
    a memory storing instructions;
    one or more Input/Output (I/O) interfaces; and
    one or more hardware processors coupled to the memory via the one or more I/O interfaces, wherein the one or more hardware processors are configured by the instructions to:
        generate a labelled pixel dataset representing cropping pattern of a Region of Interest (ROI) for building a ML crop mapping model for the ROI, wherein the generated labelled pixel dataset captures regional dependency and localized phenological indicators for the ROI, and wherein the generating the labelled pixel dataset comprises:
            receiving a plurality of remote sensing images of the ROI covering a plurality of climatic seasons spread across a predefined timespan;
            randomly selecting a set of pixels from the plurality of remote sensing images and obtaining a plurality of pixel features for each of the plurality of pixels, wherein the plurality of pixel features comprise remote sensing and time series-based features predefined for the ROI;
            analysing the plurality of pixel features obtained for each of the plurality of pixels with a plurality of crop features associated with each crop among a set of crops identified for the ROI, wherein the set of crops and corresponding plurality of features for each of the set of crops are pre-identified for the ROI using Machine Learning (ML) based approach in accordance with agro-related historical information and localized phenological features obtained for the ROI from a plurality of sources; and
            identify and label a plurality of optimal pixels from the set of pixels with a crop among the set of crops to generate the labelled pixel dataset, wherein each of the plurality of optimal pixels are identified and labelled with an associated crop label based on degree of similarity computed between a) each of the plurality of optimal pixels and corresponding plurality of pixel features with b) the set of crops and the associated plurality of crop features; and
        build the ML crop mapping model for the ROI using training data comprising the labelled plurality of optimal pixels, the corresponding plurality of pixel features and a set of remote sensing images for the ROI, wherein the ML crop mapping models learns the pattern from the training data and the set of remote sensing images to predict associated crop for each input pixel.

5. The system of claim 4, wherein, the one or more hardware processors are further configured to generate a crop map for a received remote sensing image of the ROI, using the built ML crop mapping model implemented by the one or more hardware processor, by predicting a crop class, among a plurality of crop classes, with a confidence score for each of the plurality of pixels of the received remote sensing image.

6. The system of claim 4, wherein, the one or more hardware processors are further configured to update the ML crop mapping models using a database regularly updated for the set of crops and the plurality of features associated with each of the set of crops and corresponding the set of crops.

7. One or more non-transitory machine-readable information storage mediums comprising one or more instructions which when executed by one or more hardware processors cause:
generating, a labelled pixel dataset representing cropping pattern of a Region of Interest (ROI) for building a ML crop mapping model for the ROI, wherein the generated labelled pixel dataset captures regional dependency and localized phenological indicators for the ROI, and wherein the generating the labelled pixel dataset comprises:
receiving a plurality of remote sensing images of the ROI covering a plurality of climatic seasons spread across a predefined timespan;
randomly selecting a set of pixels from the plurality of remote sensing images and obtaining a plurality of pixel features for each of the plurality of pixels, wherein the plurality of pixel features comprise remote sensing and time series-based features predefined for the ROI;
analysing the plurality of pixel features obtained for each of the plurality of pixels with a plurality of crop features associated with each crop among a set of crops identified for the ROI, wherein the set of crops, and corresponding plurality of features for each of the set of crops are pre-identified for the ROI using Machine Learning (ML) based approach in accordance with agro-related historical information and localized phenological features obtained for the ROI from a plurality of sources; and
identifying and labelling a plurality of optimal pixels from the set of pixels with a crop among the set of crops to generate the labelled pixel dataset, wherein each of the plurality of optimal pixels are identified and labelled with an associated crop label based on degree of similarity computed between a) each of the plurality of optimal pixels and corresponding plurality of pixel features with b) the set of crops and the associated plurality of crop features; and
building, the ML crop mapping model for the ROI using training data comprising the labelled plurality of optimal pixels, the corresponding plurality of pixel features and a set of remote sensing images for the ROI, wherein the ML crop mapping model learns the pattern from the training data and the set of remote sensing images to predict associated crop for each input pixel.

8. The one or more non-transitory machine-readable information storage mediums of claim 7, further comprising generating a crop map for a received remote sensing image of the ROI, using the built ML crop mapping model implemented by the one or more hardware processors, by predicting a crop class, among a plurality of crop classes, with a confidence score for each of the plurality of pixels of the received remote sensing image.

9. The one or more non-transitory machine-readable information storage mediums of claim 7, further comprising updating the ML crop mapping models using a database regularly updated for the set of crops and the plurality of features associated with each of the set of crops and corresponding the set of crops.

* * * * *